(12) United States Patent
Tsun et al.

(10) Patent No.: US 12,265,524 B2
(45) Date of Patent: Apr. 1, 2025

(54) CONTENT ITEM PROFILES

(71) Applicant: Google LLC, Mountain View, CA (US)

(72) Inventors: Stephen Tsun, Cupertino, CA (US);
Vikas Jha, Hillsborough, CA (US);
Shamim Samadi, New York, NY (US);
Vishal Goenka, Santa Clara, CA (US);
David Monsees, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/364,908

(22) Filed: Aug. 3, 2023

(65) Prior Publication Data
US 2023/0385274 A1   Nov. 30, 2023

Related U.S. Application Data

(63) Continuation of application No. 17/567,557, filed on Jan. 3, 2022, now Pat. No. 11,789,939, which is a
(Continued)

(51) Int. Cl.
*G06F 16/24*         (2019.01)
*G06F 16/9535*       (2019.01)
(Continued)

(52) U.S. Cl.
CPC .......... *G06F 16/24* (2019.01); *G06F 16/9535* (2019.01); *G06Q 30/0241* (2013.01); *G06Q 30/0251* (2013.01)

(58) Field of Classification Search
CPC . G06F 16/24; G06F 16/9535; G06Q 30/0241; G06Q 30/0251
See application file for complete search history.

(56) References Cited

U.S. PATENT DOCUMENTS 8,462,645 B1   6/2013  Harb
8,555,150 B1   10/2013 Ortmanns et al.
(Continued)

FOREIGN PATENT DOCUMENTS

JP   2007-172174   7/2007
JP   2009-503655   1/2009
(Continued)

OTHER PUBLICATIONS

International Preliminary Report on Patentability in International Appln. No. PCT/2013/039077, mailed on Nov. 11, 2014, 6 pages.
(Continued)

*Primary Examiner* — Dangelino N Gortayo
(74) *Attorney, Agent, or Firm* — Fish & Richardson P.C.

(57) ABSTRACT

Methods, systems, and apparatus, including computer programs encoded on a computer storage medium for managing a relationship between content and an environment for provisioning the content. In one aspect, a method includes receiving a request for a content item; and in response to receiving the request: selecting a creative from a plurality of creatives, the creative including a reference to a profile associated with one or more elements; retrieving content data from one or more content feeds bound to the elements; and delivering the creative and the content data to a user device.

20 Claims, 7 Drawing Sheets

Related U.S. Application Data continuation of application No. 17/110,129, filed on Dec. 2, 2020, now Pat. No. 11,481,386, which is a continuation of application No. 16/145,139, filed on Sep. 27, 2018, now Pat. No. 11,216,449, which is a continuation of application No. 13/796,598, filed on Mar. 12, 2013, now abandoned.

(60) Provisional application No. 61/643,788, filed on May 7, 2012.

(51) Int. Cl.
    *G06Q 30/0241*      (2023.01)
    *G06Q 30/0251*      (2023.01)

(56) References Cited

U.S. PATENT DOCUMENTS

| | | |
|---|---|---|
| 8,583,488 B2 | 11/2013 | Janos et al. |
| 9,165,083 B2 | 10/2015 | Buehler et al. |
| 9,514,553 B2 | 12/2016 | Nauerz et al. |
| 9,600,261 B2 | 3/2017 | Mandyam et al. |
| 9,706,006 B2 | 7/2017 | Gupta et al. |
| 9,747,141 B2 | 8/2017 | Caunter et al. |
| 2002/0046104 A1 | 4/2002 | Kaddeche et al. |
| 2006/0026067 A1 | 2/2006 | Nicholas et al. |
| 2006/0294084 A1 | 12/2006 | Patel et al. |
| 2008/0103887 A1 | 5/2008 | Oldham et al. |
| 2009/0076901 A1 | 3/2009 | Janos et al. |
| 2009/0144133 A1 | 6/2009 | Cha et al. |
| 2009/0307603 A1 | 12/2009 | Gowda et al. |
| 2010/0058416 A1 | 3/2010 | LaFreniere et al. |
| 2010/0125491 A1 | 5/2010 | Elliott et al. |
| 2010/0287048 A1 | 11/2010 | Ramer et al. |
| 2010/0293058 A1 | 11/2010 | Maher et al. |
| 2011/0072086 A1 | 3/2011 | Newsome et al. |
| 2011/0161479 A1 | 6/2011 | Freishtat et al. |
| 2011/0213655 A1 | 9/2011 | Henkin |
| 2011/0225417 A1 | 9/2011 | Maharajh et al. |
| 2011/0295689 A1* | 12/2011 | Brady ............... G06Q 30/0241 705/14.54 |
| 2011/0307515 A1 | 12/2011 | Chen et al. |
| 2012/0095828 A1 | 4/2012 | Evankovich |
| 2012/0179311 A1* | 7/2012 | Skaff ............... B60W 50/0097 180/65.21 |
| 2013/0031470 A1* | 1/2013 | Daly, Jr. ............... G06F 40/103 715/243 |
| 2013/0073400 A1 | 3/2013 | Heath |
| 2013/0282683 A1 | 10/2013 | Kohavi et al. |
| 2014/0040445 A1 | 2/2014 | Beckert et al. |
| 2021/0089521 A1 | 3/2021 | Tsun et al. |

FOREIGN PATENT DOCUMENTS

| | | |
|---|---|---|
| JP | 2011-040031 | 2/2011 |
| JP | 2011-138367 | 7/2011 |
| JP | 2012-079303 | 4/2012 |
| JP | 4923160 | 4/2012 |
| KR | 10-2011-0089473 | 8/2011 |
| WO | WO 2007014047 | 2/2007 |

OTHER PUBLICATIONS

International Search Report and Written Opinion in International Appln. No. PCT/US2013/039077, mailed on Sep. 5, 2013, 9 pages.

Notice of Allowance in Australian Appln. No. 2013259941, mailed on Dec. 7, 2017, 3 pages.

Office Action in Australian Appln. No. 2013259941, mailed on Jun. 6, 2017, 3 pages.

* cited by examiner

CONTENT ITEM PROFILES

CROSS-REFERENCE TO RELATED APPLICATIONS

This application is a continuation application of, and claims priority to, U.S. patent application Ser. No. 17/567,557, titled "Content Item Profiles," filed on Dec. 2, 2020, which is a continuation application of, and claims priority to, U.S. patent application Ser. No. 17/110,129, now U.S. Pat. No. 11,481,386, titled "Content Item Profiles," filed on Dec. 2, 2020, which is a continuation application of, and claims priority to, U.S. patent application Ser. No. 16/145,139, now U.S. Pat. No. 11,216,449, titled "Content Item Profiles," filed on Sep. 27, 2018, which is a continuation application of, and claims priority to, U.S. patent application Ser. No. 13/796,598, now abandoned, titled "Content Item Profiles," filed on Mar. 12, 2013, which application claims the benefit under 35 U.S.C. § 119 (e) of U.S. Provisional Application No. 61/643,788, filed May 7, 2012. The complete disclosures of the foregoing applications are incorporated herein by reference in their entirety for all purposes.

BACKGROUND

This disclosure relates to managing a relationship between content and an environment for content presentation.

Publications (e.g., electronic publications, websites, web application, mobile application, IPTV, digital video etc.) may include third party content items (e.g., advertisements), for example, to financially support a resource provider's (e.g., website publisher) operations. Some resource providers do not maintain a third party content infrastructure, and thus depend on content serving entities to recruit third party content sponsors (e.g., advertisers) and to serve content items. Content serving entities can maintain data about user traffic viewing a publication, and user interaction with served content items.

Content sponsors can use content item management and serving solutions to manage the scope of a digital content item campaign. For example, content item management and serving solutions may streamline workflows for planning, trafficking, targeting, serving, optimization and/or reporting of content item delivery.

SUMMARY

This disclosure relates to using profiles as a way to manage (e.g., summarize, protect and/or evolve) a relationship between content (e.g., text, images, links, call-to-actions, video, etc.) of a content item (e.g., advertisement) and a creative (e.g., environment, functionality, presentation, etc.) for the content item.

In general, an innovative aspect of the subject matter described in this specification can be embodied in methods that include the actions of receiving a request for a content item and in response to receiving the request: selecting a creative from a plurality of creatives, the creative including a reference to a profile associated with one or more elements; retrieving content data from one or more content feeds bound to the elements; and delivering the creative and the content data to a user device. Other implementations may include corresponding systems, apparatus, and computer programs, configured to perform the actions of the methods, encoded on computer storage devices.

These and other implementations can each optionally include one or more of the following features. The request can be received from an application executing on the user device. The creative can be selected from the plurality of creatives based on optimization data and the application executing on the user device. The optimization data can include performance history for the plurality of creatives, demographic information associated with the application executing on the user device, or capabilities of the user device. Each of the elements can include one or more attributes and the content feeds bound to the elements provide values for the attributes. The reference to the profile can be an alphanumeric identifier embedded in the selected creative that uniquely corresponds to the profile. Each of the creatives can include the alphanumeric identifier uniquely corresponding to the profile.

The one or more content feeds can be selected from the group comprising a comma-separate-value file, a spreadsheet, a database, or a database query. The selected creative can be a first creative, and the method can further receive a second request for a content item; and in response to receiving the second request: select a second creative from a plurality of creatives, the second creative referencing the profile; retrieve second content data from the one or more content feeds bound to the elements; and deliver the second creative and the second content data to a user device.

In general, another aspect of the subject matter described in this specification can be embodied in methods that include the actions of receiving a request for a content item and in response to receiving the request: selecting a profile from a plurality of profiles, where the selected profile is associated with one or more elements; retrieving content data from one or more content feeds bound to the one or more elements; selecting a creative from a plurality of creatives, the selected creative including a reference to the selected profile; and delivering the retrieved content data and the selected creative to a user device. Other embodiments of this aspect include corresponding systems, apparatus, and computer programs, configured to perform the actions of the methods, encoded on computer storage devices.

These and other implementations can each optionally include one or more of the following features. The request can be received from an application executing on the user device. The profile can be selected from the plurality of profiles based on optimization data and the application executing on the user device. The optimization data can include performance history for the plurality of profiles, demographic information associated with the application executing on the user device, or capabilities of the user device. The profile can be selected from the plurality of profiles in response to performing a real-time profile selection auction. Each of the elements includes one or more attributes; and the content feeds bound to the elements can provide values for the attributes. The reference to the profile can be an alphanumeric identifier embedded in the selected creative that uniquely corresponds to the profile. Each of the creatives can include the alphanumeric identifier uniquely corresponding to the profile. The one or more content feeds can be selected from the group comprising a comma-separate-value file, a spreadsheet, a database, or a database query. Selecting one or more content data feeds bound to the elements based on data received with the request.

Particular implementations of the subject matter described in this specification may be implemented so as to realize one or more of the following potential advantages.

Using profiles may benefit content sponsors (e.g., advertisers) by streamlining the development process for the content and creative components of a content item. For example, a profile can manage a relationship between the content of a content item and the creative for provisioning the content to a user of a user device. The separation of content from creatives may allow a content sponsor to unilaterally develop and modify content for a content item and the creatives for provisioning this content. That is, by using a profile, a content sponsor can make changes to content for a content item without also being required to modify a creative to accommodate the changes. For example, a creative designed to display three product items would not require modifications in response to changes to the underlying content, or the product items (e.g., replacing existing product items with new product items). Likewise, a content sponsor may make changes to a creative without being required to modify the underlying content in response to the changes. For example, a creative designed to display three product items may be modified to display the three product items in a different way or to display only two product items. Such modifications to the creative would not require subsequent changes to the underlying content data.

The use of a profile may allow for parallel development of content and creatives. For example, a profile may define the structure of the content that a creative will receive, but not immediately provide values for the content. By relying on the profile, a content sponsor can develop new creatives based on the structure of the content defined in the profile, without requiring knowledge or access to the underlying content that will ultimately be displayed in the creative when the creative is delivered to a user device.

A profile may provide a dimension across multiple creatives, corresponding to the profile, which an optimization system can use to influence creative selection. In addition, the use of profiles may allow content sponsors to aggregate creative performance by profile and analyze performance of creatives at a level other than aesthetics, which remains quite subjective.

Details of one or more implementations of the subject matter described in this specification are set forth in the accompanying drawings and the description below. Other features, aspects, and potential advantages will become apparent from the description, the drawings, and the claims.

BRIEF DESCRIPTION OF THE DRAWINGS

Like reference numbers and designations in the various drawings indicate like elements.

DETAILED DESCRIPTION

Overview

In a content item management system, a profile can be used as a way to manage (e.g., summarize, protect and/or evolve) a relationship between content (e.g., text, images, links, call-to-actions, etc.) of a content item (e.g., advertisement) and a creative (e.g., environment, functionality, presentation, etc.) for the content item. In some implementations, a profile defines a relationship between the content of a content item and creatives for delivering the content to a user of a user device (e.g., as a resource on a publication). A profile includes, or references, elements and attributes. Elements define the structure of content for a content item. For example, an element can specify that content of a content item is a headline, product, call-to-action, background, and the like. Each element includes at least one attribute. Attributes specify the type of content to be included in an element and the values for this content. For example, a product element may include description, image, and price attributes. Content feeds can provide values for the attributes. In some implementations, content feeds are bound to elements. For example, a products comma-separated-value file delineating attribute values for any suitable number of product elements may be bound to a product element contained in a profile.

The content item management system can receive a request for a content item from a user device (e.g., from an application executing on a user device) or from a resource provider (e.g., a publisher). In some implementations, in response to the request, the content item management system can select a creative and identify a profile that the creative is linked to (e.g., by using a profile identifier embedded in the creative). The content item management system can then retrieve content data from content feeds that are bound to elements included or associated with the profile and deliver the selected creative and the retrieved content data to a user device. In other implementations, in response to the request, the content item management system can first select a profile, and then select a creative corresponding to, or referencing, the profile. Content data can be retrieved from content feeds bound to elements of the profile. The content item management system may utilize profile optimization when selecting a profile and further when selecting the creative. In other implementations, in response to the request, the content item management system can select multiple creatives or profiles in parallel along with corresponding content. The content item management system can then employ a real time auction and/or utilize optimization data to select a best creative and content to deliver to a user device.

Example Operating Environment

Figure 1:
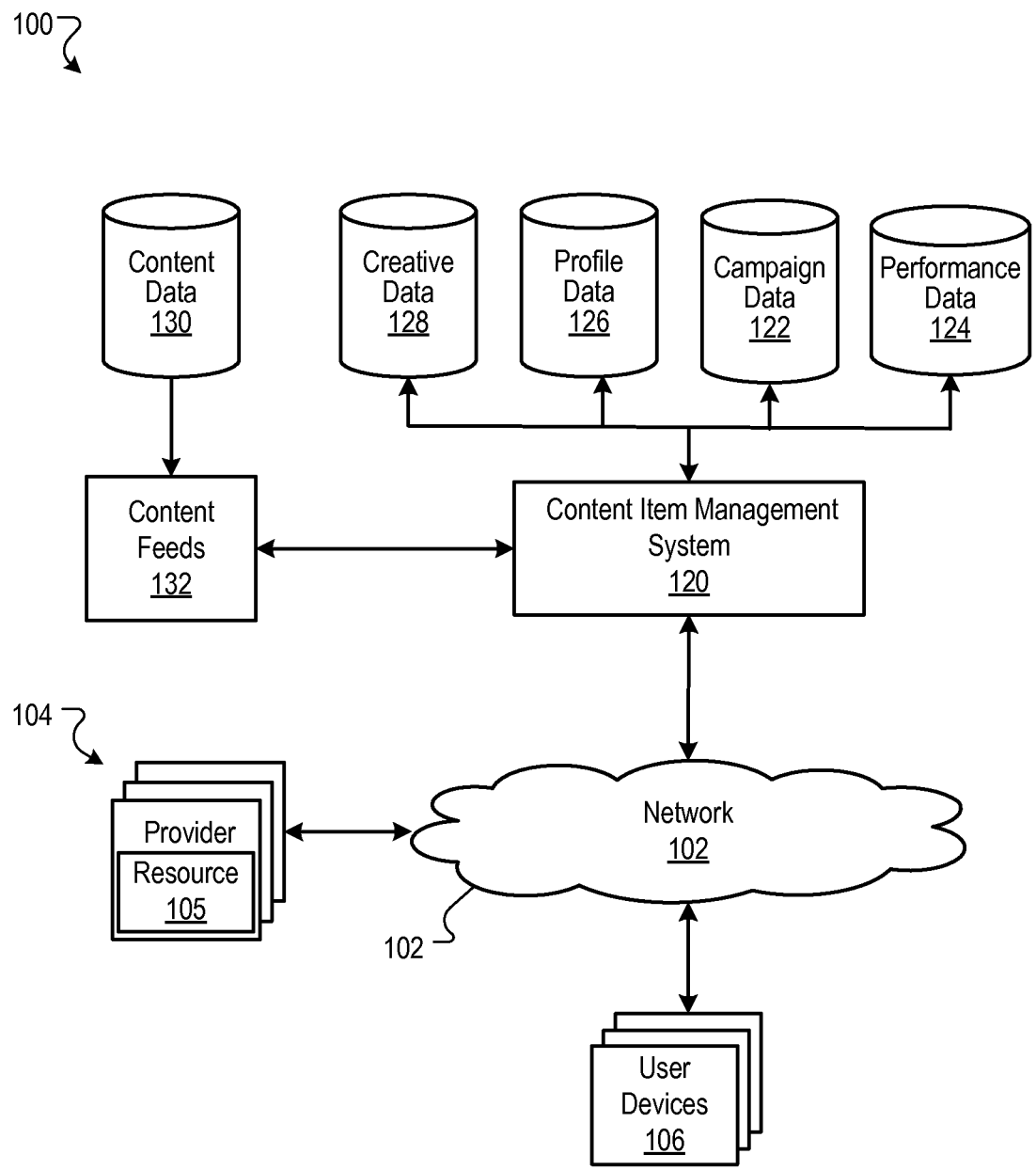
FIG. 1 is a block diagram of an example environment in which content items can be delivered by a content item management system.

FIG. 1 is a block diagram of an example environment 100 in which content items (e.g., advertisements) can be delivered by content item management system 120 over a computer network 102 to user devices 106. A computer network 102, such as a local area network (LAN), wide area network (WAN), the Internet, or a combination thereof, connects resource provider publications 104, user devices 106, and content item management system 120. The online environment 100 may include many thousands of resource provider publications 104 and user devices 106.

A publication 104 can include one or more resources 105 associated with a domain name and hosted by one or more servers. A publication may be, for example, an electronic publication, a website, or a collection of web pages formatted in hypertext markup language (HTML) that can contain text, images, multimedia content, and programming elements, such as scripts. Each publication 104 is maintained by a resource provider (e.g., a publisher), which is an entity that controls, manages and/or owns the publication 104.

A resource is any data that can be provided by the resource provider 104 over the network 102 and that is associated with a resource address. Resources include HTML pages, word processing documents, and portable document format (PDF) documents, images, video, and feed sources, to name just a few. The resources can include content, such as words, phrases, pictures, and so on, and may include embedded information (such as meta information and hyperlinks) and/or embedded instructions (such as JavaScript scripts).

A user device 106 is an electronic device that is under the control of a user and is capable of requesting and receiving resources over the network 102. Example user devices 106 include personal computers, mobile communication devices, tablet devices, smart phones, set top device, or other electronic devices that can send and receive data over the network 102. A user device 106 typically includes a user application, such as a web browser, to facilitate the sending and receiving of data over the network 102. The web browser can enable a user to display and interact with text, images, videos, music, content items, and other information typically located on a web page at a website on the World Wide Web or a local area network.

In some implementations, content item management system 120 facilitates the provisioning of content items with the resources 105. In particular, the content item management system 120 allows content sponsors (e.g., advertisers) to define targeting rules that take into account characteristics of the particular user to provide targeted content items for the users. Example targeting rules include keyword targeting, in which content sponsors provide bids for keywords that are present in either search queries or webpage content. Content items that are associated with keywords having bids that result in an content item slot being awarded in response to an auction are selected for displaying in the content item slots.

When a user of a user device 106 selects a content item, the user device 106 generates a request for a landing page of the content item, which is typically a webpage of the content sponsor. For example, the resource providers 104 may include content sponsors, each hosting respective web pages, some of which are landing pages for the content items of the content sponsors.

These targeted content items can be provided for many different resources, such as the resources 105 of the resource provider publications 104, and on a search results page resource. For example, a resource 105 from a resource provider publication 104 includes instructions that cause the user device to request content items from the content item management system 120. The request includes a resource provider identifier and, optionally, keyword identifiers related to the content of the resources 105. The content item management system 120, in turn, provides targeted content items to the particular user device.

The content item management system 120 includes a data storage system that stores campaign data 122 and performance data 124. The campaign data storage 122 stores content item information, targeting information, and budgeting information for content sponsors. The performance data 124 stores data indicating the performance of the content items that are served. Such performance data can include, for example, click-through-rates for content items, the number of impressions for content items, and the number of conversions for content items. Other performance data can also be stored.

A content item includes content and creatives for displaying the content. The content of a content item is the data that is displayed, or presented, on a user device 106. For example, content for a content item may include a headline, body text, a call to action, an image of a product, a price of a product, a description of a product, a link, interactive media, and the like. Content for content items can be stored in a data storage system that stores content data 130. In some implementations, content data 130 is provided to content item management system 120 through content feeds 132. Content feeds 132 are structured files that delineate content data 130 for a content item. For example, content feeds 132 may be comma-separated value (.csv) files, spreadsheet files, database files, links, database queries, and the like.

The content item management system 120 includes a data storage system that stores creative data 128. A creative is the environment (e.g., design, layout, functionality, etc.) for provisioning content data 130 of content items to user devices 106. For example, a creative may be a banner, text, graphic, animation, rich media, flash in-page, custom in-page, and the like. The creatives stored with creative data 128 can be static or dynamic. A static creative does not change from impression to impression. For example, the content of the content item remains constant when a static creative is delivered to a user device 106. On the other hand, a dynamic creative may differ from impression to impression. For example, a dynamic creative can contain different content from impression to impression based on various signals that are present when the dynamic creative is requested from the content item management system 120.

The content item management system 120 includes a data storage system that stores profile data 126. A profile can be used to manage a relationship between content data 130 of a content item and creative data 128. In some implementations, a profile acts as an intermediary, or abstract description, for a relationship between content data 130 and creative data 128. For example, a profile can define the structure of content contained in content data 130 while not immediately specifying the underlying content included in content data 130. A creative associated with such a profile (e.g., by referencing a profile identifier of the profile), can be designed based on the defined structure of the content in the profile, without requiring specifics of the content data 130 that will ultimately be presented in the creative.

In some implementations, a profile utilizes elements to define the structure of content data 130. An element can be any suitable component for a content item. For example, elements may include headings, products, call-to-actions, images, multimedia, and the like. Elements include attributes that specify values for the element. For example, a product element may include product heading, product price, and product image attributes. In some implementations, the values for attributes are obtained from any suitable number of content feeds 132. For example, a product content feed can be bound to a product element with heading, price, and image attributes. Such a product content feed may be a .csv file with attribute values for each of the heading, price, and image attributes for multiple product element instances.

Learning techniques can be employed using dynamic creatives to optimize the delivery of content items. For example, content item management system 120 can determine which dynamic creatives are most successful, with success being measured, for example, by click-through-rates. That is, content item management system 120 can track and rank various combinations of content and creatives presented on the results page for a search engine by measuring the click-through-rate of the delivered content items.

In some implementations, a profile may provide a dimension across multiple creatives, corresponding to the profile, which an optimization system can use to influence creative selection. For example, on a mobile device, profiles with single elements may perform better because creatives corresponding to such profiles appear less cluttered when delivered and presented on a mobile user device. In another example, users of a certain website may represent a demographic bias towards highly compact content and may prefer to see more content, or elements, in a single creative as opposed to sparse creatives containing minimal content. Such biases are can be captured by a profile and used to provide a signal to the optimization system. When new creatives are associated with the same profile, the profile bias can influence higher sampling rates for the new creatives, even when no prior performance data is available for the new creatives. In some implementations, content sponsors can use content item management system to aggregate creative performance by profile and analyze performance of creatives at a level other than aesthetics, which remains quite subjective. For example, in addition to typical objective performance data for creatives, such as creative size and placement, the use of profiles may further provide objective insight into the presentation aspects of creatives to help guide content sponsors in the development of new creatives.

Figure 2:
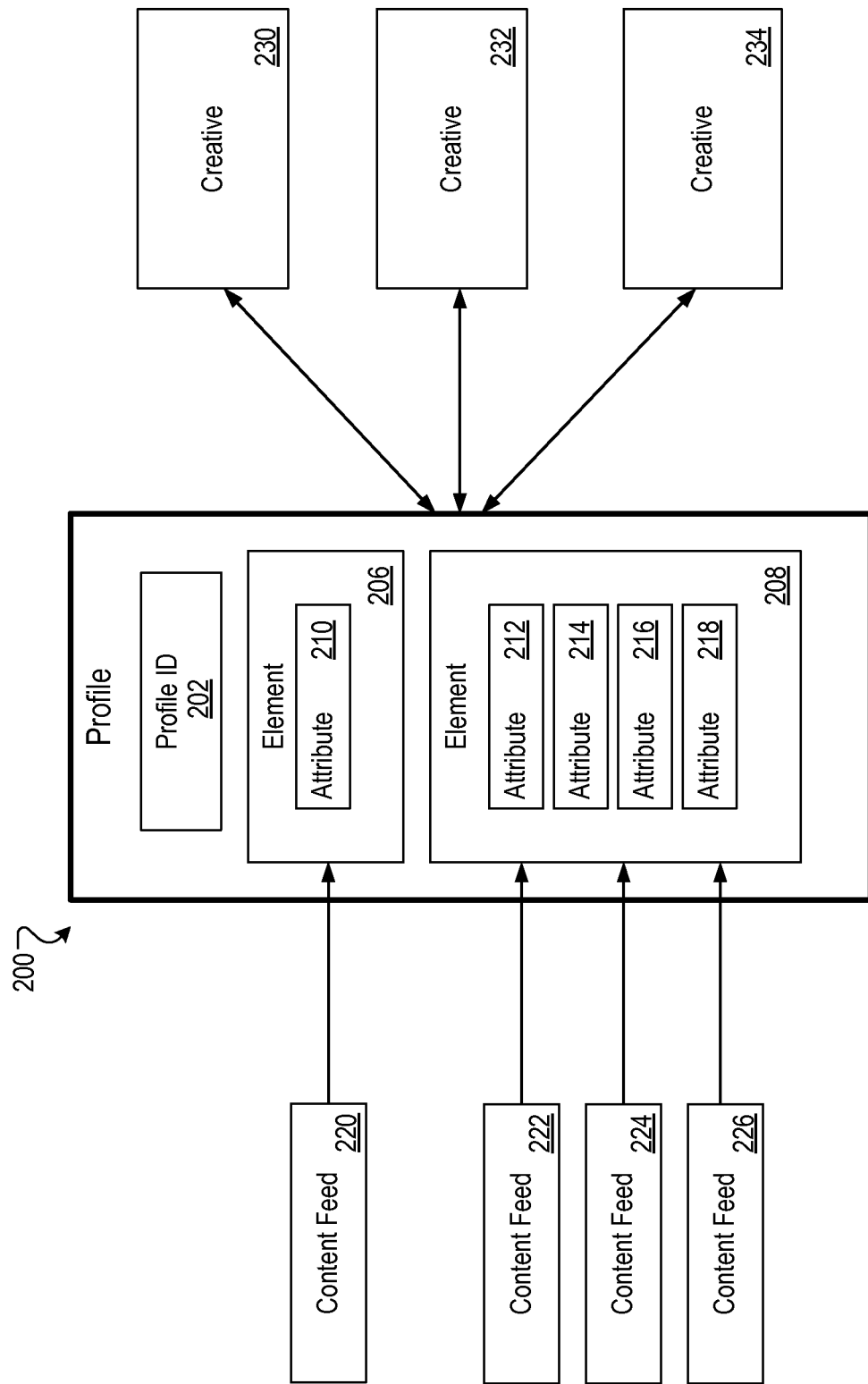
FIG. 2 is an example of a profile defining a relationship between content for a content item and creatives for provisioning the content to user devices.

FIG. 2 is an example of a profile 200 defining a relationship between content for a content item and creatives for provisioning the content to user devices. Profile 200 includes a profile ID 202. Profile ID 202 uniquely identifies profile 200. For example, profile ID 202 can be an alphanumeric identifier that distinguishes profile 200 from other profiles. Elements 206 and 208 specify the structure of content data for profile 200 using attributes 210, 212, 214, 216, and 218. Elements 206 and 208 can be any suitable component for a content item. In some implementations, elements 206 and 208 may be headings, products, call-to-actions, images, multimedia, and the like. For example, element 208 may be a product element with description, price, quantity, and image attributes. Content feeds 220, 220, 224, and 226 are mapped, or bound, to elements 206 and 208, respectively. In some implementations, the content feeds 220-226 supply values to attributes 210-218. For example, a products.csv content feed can be bound to a product element such that the products content feed supplies values for at least one attribute included in the product element. Although element 206 is shown with one content feed and element 208 is shown with three content feeds, any suitable number of content feeds may be bound to an element. In some implementations, content feeds 220-226 are structured files. For example, content feeds 220-226 may be comma-separated values, spreadsheets, databases, database queries, and the like. Creatives 230, 232, and 234 specify the environment (e.g., design, layout, functionality, etc.) for provisioning content data from content feeds 220-226 to user devices. Creatives 230, 232, and 234 can be linked to creative profile 200 by referencing profile ID 202. For example, profile ID 202 may be embedded in the Actionscript of creatives 230-234. Creatives 230-234 can be designed to display elements 206 and 208, including attributes 210-218, without requiring specific information about the content data the will ultimately be provided by content feeds 220-226. For example, profile 200 can define the structure of content for a content item (e.g., element 206 includes attribute 210 and element 208 including attributes 212-218). A creative can be designed based on the structure of content for profile 200 by providing accommodations for each of elements 206 and 208 and their respective attributes 210-218.

The separation of content data and content feeds 220-226 from creatives 230-234, via creative profile 200, allows any number of creatives to be designed and mapped to creative profile 200 (e.g., by referencing profile ID 202) and thus associated with content data from content feeds 220-226. In addition, the isolation of content data from creatives allows for parallel development and unilateral changes to creatives 230-234 and the underlying content provided by content feeds 220-226. For example, a content sponsor can change the content delivered by content feeds 220-226, or map new content feeds to elements 206 and 208, but not be required to alter the creatives 230-234 in response to the changes. As long as the content structure defined in profile 200 (e.g., the elements 206 and 208 and their respective attributes 210-218), remains constant, creatives 230-234 referencing the profile 200 would not need to be modified to accommodate the changes to the underlying content or content feeds. Similarly, if creatives 230-234 are modified or a new creative is designed and linked to profile 200, as long as the structure of the content defined in the profile 200 remains constant, the content and content feeds 220-226 need not be modified when new creatives are designed or existing creatives are modified.

Figure 3:
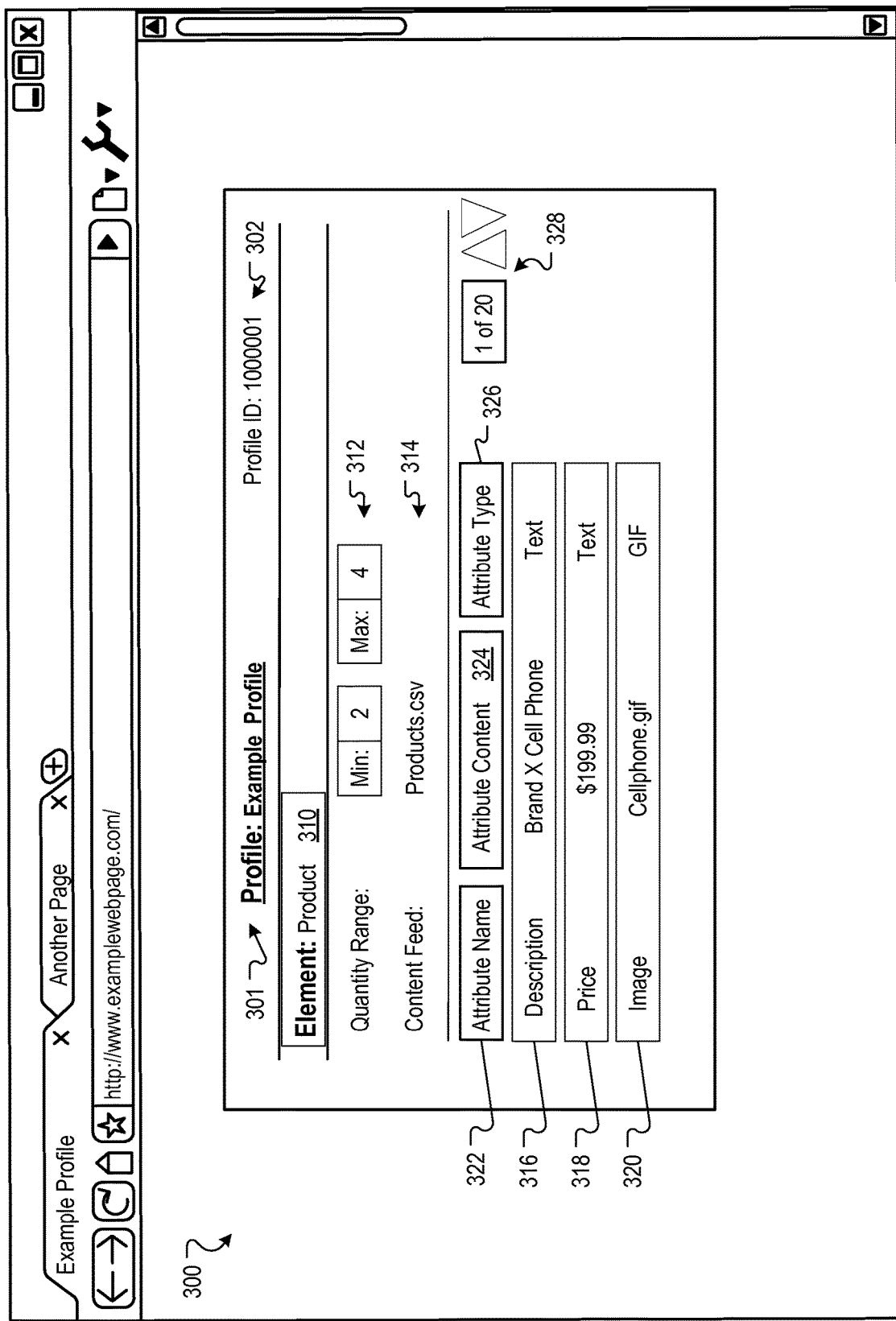
FIG. 3 is an example user interface for configuring a profile.

FIG. 3 is an example user interface 300 for configuring profile 301. Profile 301 defines the structure of content for a content item. Profile 301 includes profile ID 302. In some implementations, profile ID 302 is embedded into the code of a creative. For example, a creative can present content from content feeds bound to elements in profile 301 by referencing or linking to profile ID 302.

Profile 301 includes element 310. Although profile 301 is shown with one element, profile 301 may include any suitable number of elements. In some implementations, element 310 includes a quantity range 312. For example, quantity range 312 specifies the minimum and maximum number of instances for an element. More specifically, a creative bound to profile 301 (e.g., by referencing profile ID 302) would be required to support at least the minimum number of elements specified by quantity range 312 but no more than the maximum number of elements specified by quantity range 312. For example, element 310 can be a product element with a quantity range 312 between two and four. A creative that is bound to profile 301 would be required to display or present between two and four product elements (including attributes 316-320 for each product element).

Content feed 314 is bound to element 310. Although one content feed is bound to element 310, in some implementations, any suitable number of content feeds may be bound to element 310. Content feed 314 specifies a location of content data. For example, content feed 314 may correspond to a comma-separated value file that includes raw data for attributes 316-320 for multiple instances of element 310.

Element 310 includes attributes 316, 318, and 320. In some implementations, element 310 may include more or less attributes. Each attribute 316, 318, and 320 includes, for example, attribute name 322, attribute content 324, and attribute type 326 parameters. Values for parameters 322-326 can be obtained from content feed 314. In some implementations, attribute name 322 identifies an attribute, attribute content 324 is the raw data for an attribute, and attribute type 326 identifies a data type for attribute content 324. For example, attribute type 326 may indicate that attribute content 324 of attribute 316 is "Text." Attribute types may include, for example, text, GIF, html, and any suitable type of content that may be provisioned by a creative. In some implementations, content feed 314 may specify multiple instances of an element. For example, content feed 314 may specify, or include, twenty product elements. In such a case, navigation 328 may be configured to navigate between the twenty product elements included in content feed 314.

Figure 4:
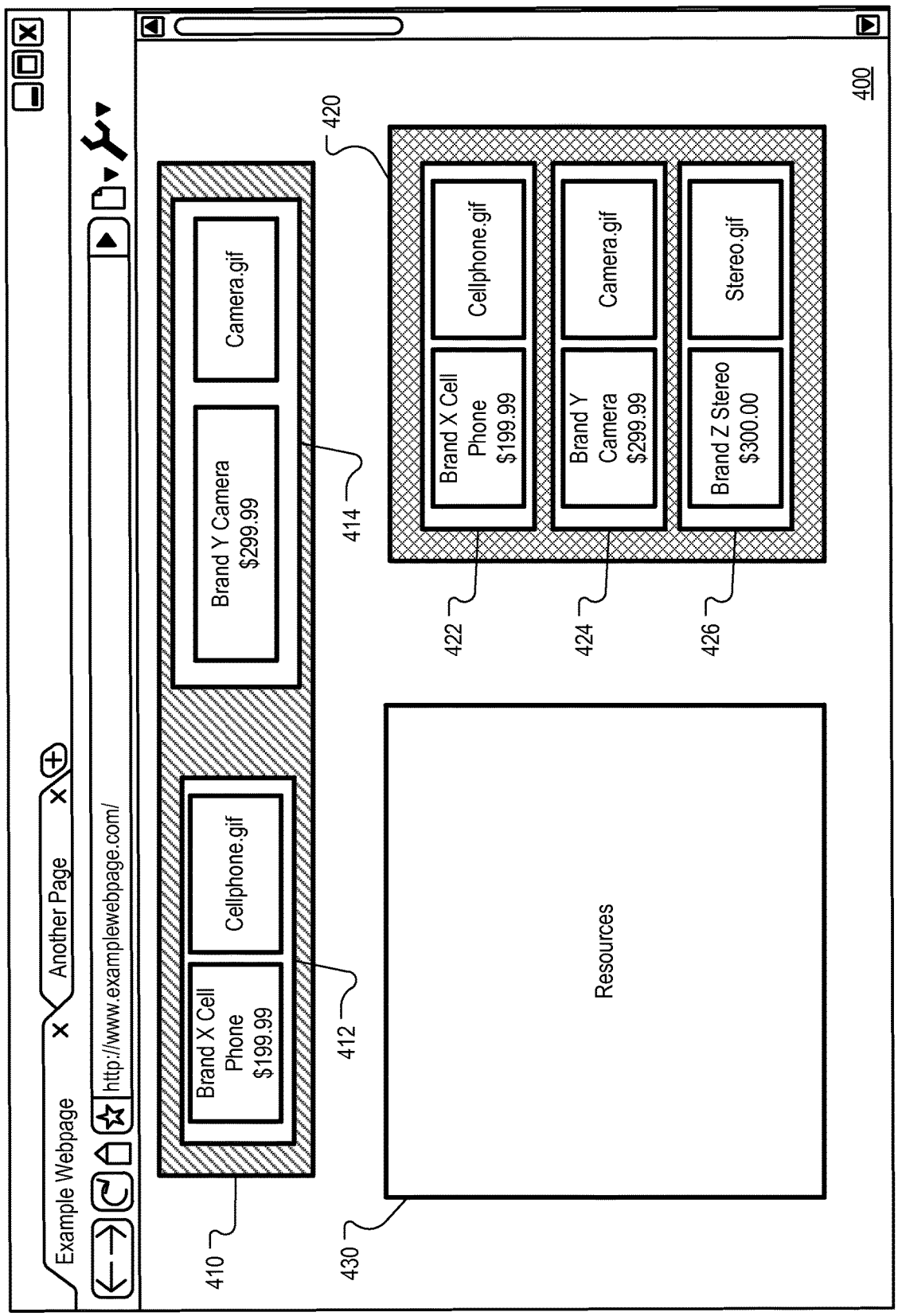
FIG. 4 is an example of creatives including content data displayed on a webpage.

FIG. 4 is an example of creatives 410 and 420 displayed on a webpage 400 including resources 430. Creatives 410 and 420 can include references to a profile. For example, creatives 410 and 420 can include embedded references to profile 301. By referencing profile 301, creatives 410 and 420 will ultimately display content data from content feed 314. Creatives 410 and 420 are designed to display the specified quantity, or range, of elements provided in a creative profile. For example, when creatives 410 and 420 reference profile 301, creatives 410 and 420 are required to display between two and four elements 310, as defined in profile 301. More specifically, creatives 410 and 420 are required to display attributes for elements of a profile (e.g., attributes 316-320 for element 310 of profile 301). For example, creative 410 can include product element 412 and product element 414. Similarly, creative 420 can include product element 422, product element 424, and product element 426.

Figure 5:
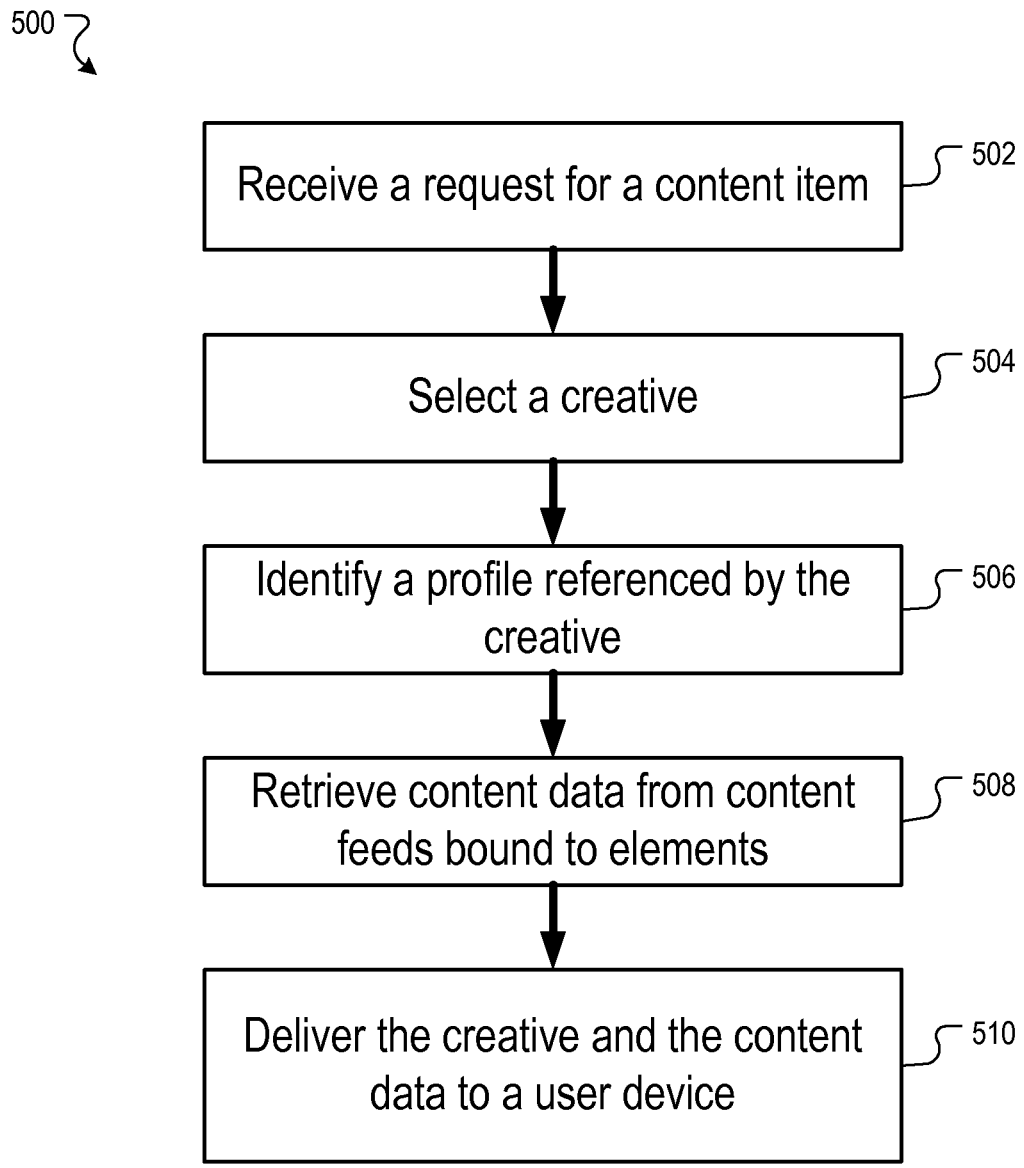
FIG. 5 is an example flowchart for delivering content data and a creative to a user device in response to a request for a content item.

FIG. 5 is an example flowchart 500 for delivering content data and a creative to a user device in response to a request for a content item. At 502, a content item management system (e.g., content item management system 120) can receive a request for a content item. For example, the content item management system may receive a request from an application executing on a user device (e.g., user device 106) or a resource provider (e.g., a publisher). At 504, in response to receiving the request, the content item management system can select a creative (e.g., from creative data 128). At 506, the content item management system can identify a profile (e.g., from profile data 126) that the creative references (e.g., by using a profile identifier embedded in the creative). At 508, the content item management system can retrieve content data (e.g., content data 130) from content feeds (e.g., content feeds 132) that are bound to elements associated with the profile. At 510, the content item management system can deliver the selected creative and the retrieved content data to a user device (e.g., user device 106).

Figure 6:
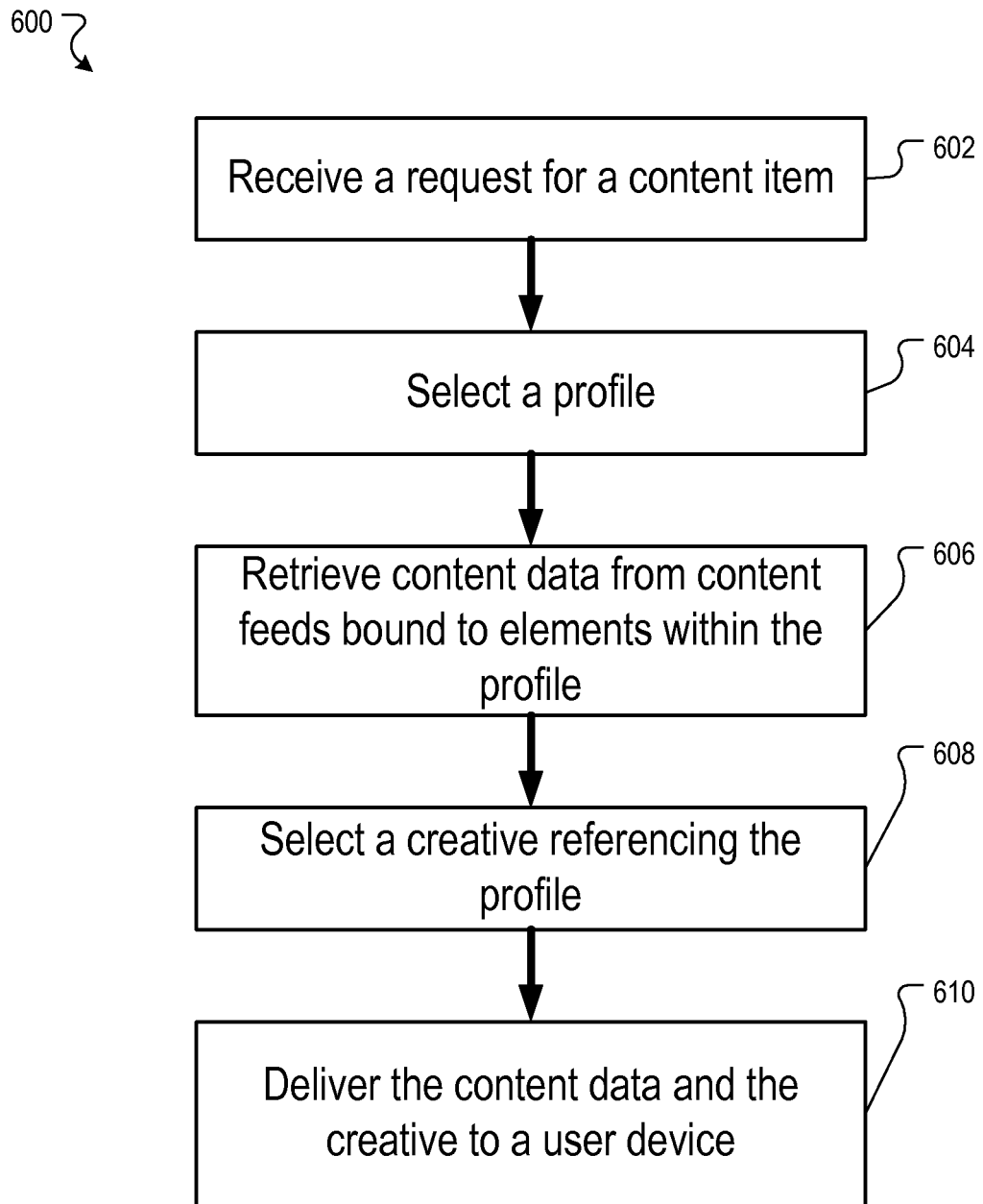
FIG. 6 is an example flowchart for delivering content data and a creative to a user device in response to a request for a content item.

FIG. 6 is an example flowchart 600 for delivering content data and a creative to a user device in response to request for a content item. At 602, a content item management system (e.g., content item management system 120) can receive a request for a content item. For example, the content item management system may receive a request from an application executing on a user device (e.g., user device 106) or a resource provider (e.g., a publisher). At 604, in response to receiving the request, the content item management system can select a profile (e.g., from profile data 126). At 606, the content item management system can retrieve content data from content feeds bound to elements within the selected profile. For example, content item management system 120 can retrieve content data from content data 130 using content feeds 132. At 608, the content item management system can select a creative referencing the profile. For example, using a reference to the profile embedded in the creative. At 610, the content item management system can deliver the retrieved content data and the selected creative to a user device (e.g., user device 106).

Additional Implementation Details

Figure 7:
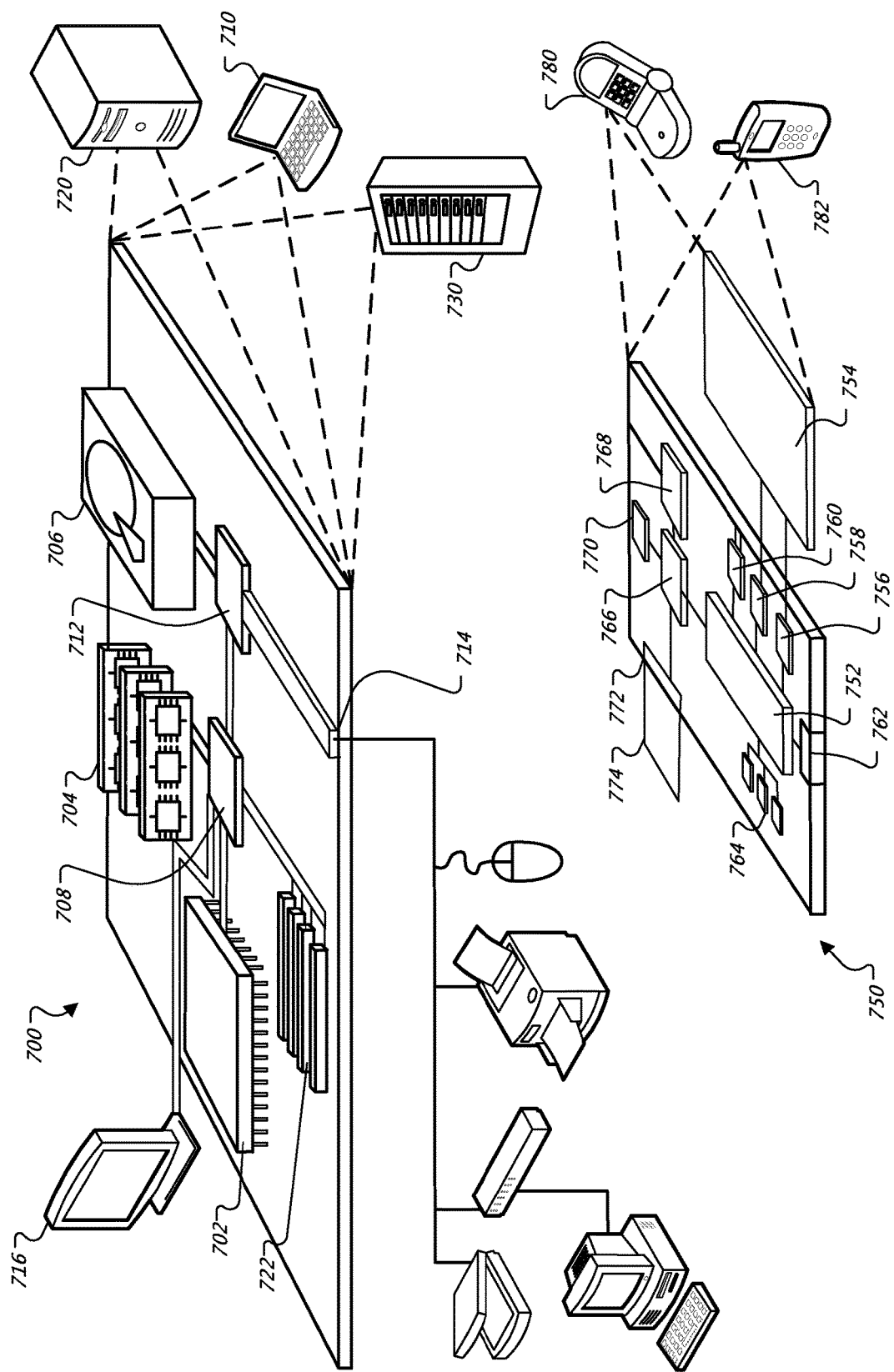
FIG. 7 shows an example of a generic computer device and a generic mobile computer device.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 722, and a low speed interface 712 connecting to low speed bus 714 and storage device 706. Each of the components 702, 704, 706, 708, 722, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 722, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 730. In addition, it may be implemented in a personal computer such as a laptop computer 710. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer implemented method, comprising:
   binding, by one or more computing devices, a particular creative to a source of information that is used to populate, in response to content requests, one or more portions of the particular creative that lack fixed content;
   learning, by the one or more computing devices based on prior interactions with multiple different creatives that were previously distributed, one or more combinations of items presented by a set of highest ranked creatives among the multiple different creatives;
   selecting, by the one or more computers, the particular creative for presentation in response to receipt of a request to serve content, to a user device, in conjunction with an electronic document being served to the user device;
   selecting, by the one or more computers, a particular combination of items, from among the one or more combinations of items, that was presented by at least one creative among the highest ranked creatives;
   modifying, by the one or more computing devices, an arrangement of the particular combination of items selected and visually presented by the particular creative based on the learned one or more combinations of items;
   serving, by the one or more computing devices, the modified particular creative to the user device for display in conjunction with the electronic document.

2. The computer implemented method of claim 1, wherein selecting the particular creative comprises selecting, by the one or more computing devices, the particular creative based on characteristics of the user device.

3. The computer implemented method of claim 2, wherein at least some of the characteristics of the user device are based on a size of a display of the computing device.

4. The computer implemented method of claim 3, wherein selecting the particular creative comprises selecting the particular creative based on a past performance of the particular creative relative to a past performance of other creatives.

5. The computer implemented method of claim 4, further comprising biasing a first content item that was more recently added to the multiple different creatives for identification over a second creative that was less recently added to the multiple different creatives.

6. The computer implemented method of claim 5, further comprising:
   receiving a subsequent request to serve content;
   retrieving, responsive to the subsequent request to serve content, content from a third party source that is maintained independently from the one or more computers based on information received in the subsequent request;
   inserting the retrieved content into a portion of a creative that lacks fixed content; and
   distributing the creative including the inserted retrieved content for presentation at a remote device.

7. The computer implemented method of claim 6, wherein the electronic document is generated by a native application.

8. A non-transitory computer-readable storage medium storing instructions that, upon execution by one or more computing devices, cause the one or more computing devices to perform operations comprising:
   binding a particular creative to a source of information that is used to populate, in response to content requests, one or more portions of the particular creative that lack fixed content;
   learning, based on prior interactions with multiple different creatives that were previously distributed, one or more combinations of items presented by a set of highest ranked creatives among the multiple different creatives;
   selecting the particular creative for presentation in response to receipt of a request to serve content, to a user device, in conjunction with an electronic document being served to the user device;
   selecting a particular combination of items, from among the one or more combinations of items, that was presented by at least one creative among the highest ranked creatives;
   modifying an arrangement of the particular combination of items selected and visually presented by the particular creative based on the learned one or more combinations of items;
   serving the modified particular creative to the user device for display in conjunction with the electronic document.

9. The non-transitory computer-readable storage medium of claim 8, wherein selecting the particular creative comprises selecting, by the one or more computing devices, the particular creative based on characteristics of the user device.

10. The non-transitory computer-readable storage medium of claim 9, wherein at least some of the characteristics of the user device are based on a size of a display of the computing device.

11. The non-transitory computer-readable storage medium of claim 10, wherein selecting the particular creative comprises selecting the particular creative based on a past performance of the particular creative relative to a past performance of other creatives.

12. The non-transitory computer-readable storage medium of claim 11, wherein the instructions cause the one or more computing devices to perform operations further comprising biasing a first content item that was more recently added to the multiple different creatives for identification over a second creative that was less recently added to the multiple different creatives.

13. The non-transitory computer-readable storage medium of claim 12, wherein the instructions cause the one or more computing devices to perform operations further comprising:
   receiving a subsequent request to serve content;
   retrieving, responsive to the subsequent request to serve content, content from a third party source that is maintained independently from the one or more computers based on information received in the subsequent request;
   inserting the retrieved content into a portion of a creative that lacks fixed content; and
   distributing the creative including the inserted retrieved content for presentation at a remote device.

14. The non-transitory computer-readable storage medium of claim 13, wherein the electronic document is generated by a native application.

15. A system, comprising:
   a storage device; and
   one or more computing devices communicatively coupled to the storage device, wherein the one or more computing devices are configured to execute instructions that are stored in the storage device, and execution of the instructions causes the one or more computing devices to perform operations comprising:
      binding a particular creative to a source of information that is used to populate, in response to content requests, one or more portions of the particular creative that lack fixed content;
      learning, based on prior interactions with multiple different creatives that were previously distributed, one or more combinations of items presented by a set of highest ranked creatives among the multiple different creatives;
      selecting the particular creative for presentation in response to receipt of a request to serve content, to a user device, in conjunction with an electronic document being served to the user device;
      selecting a particular combination of items, from among the one or more combinations of items, that was presented by at least one creative among the highest ranked creatives;
      modifying an arrangement of the particular combination of items selected and visually presented by the particular creative based on the learned one or more combinations of items;
      serving the modified particular creative to the user device for display in conjunction with the electronic document.

16. The system of claim 15, wherein selecting the particular creative comprises selecting, by the one or more computing devices, the particular creative based on characteristics of the user device.

17. The system of claim 16, wherein at least some of the characteristics of the user device are based on a size of a display of the computing device.

18. The system of claim 17, wherein selecting the particular creative comprises selecting the particular creative based on a past performance of the particular creative relative to a past performance of other creatives.

19. The system of claim 18, wherein the instructions cause the one or more computing devices to perform operations further comprising biasing a first content item that was more recently added to the multiple different creatives for identification over a second creative that was less recently added to the multiple different creatives.

20. The system of claim 19, wherein the instructions cause the one or more computing devices to perform operations further comprising:
   receiving a subsequent request to serve content;
   retrieving, responsive to the subsequent request to serve content, content from a third party source that is maintained independently from the one or more computers based on information received in the subsequent request;
   inserting the retrieved content into a portion of a creative that lacks fixed content; and
   distributing the creative including the inserted retrieved content for presentation at a remote device.

* * * * *